United States Patent [19]
Walter et al.

[11] Patent Number: 5,611,834
[45] Date of Patent: Mar. 18, 1997

[54] METHOD FOR CONTROLLING THE FREE DEFORMATION OF THERMOPLASTIC MATERIAL

[75] Inventors: Claus Walter; Paul Schmitz, both of Mitterteich, Germany

[73] Assignee: Schott Rohrglas GmbH, Bayreuth, Germany

[21] Appl. No.: 308,508

[22] Filed: Sep. 21, 1994

[30] Foreign Application Priority Data

Sep. 21, 1993 [DE] Germany ............ 43 32 024.4

[51] Int. Cl.⁶ .................................. C03B 21/00
[52] U.S. Cl. .................... 65/29.12; 65/29.14; 65/102; 65/109; 65/113; 65/158; 65/160; 65/270; 65/271; 65/272; 65/280; 65/DIG. 13
[58] Field of Search .............. 65/29.12, 29.14, 65/102, 105, 108, 109, 29.1, 29.11, 158, 160, 270–272, 278, 280, 282, 113, DIG. 13

[56] References Cited

U.S. PATENT DOCUMENTS

| | | | |
|---|---|---|---|
| 2,282,993 | 5/1942 | Dichter | 65/271 |
| 3,415,370 | 12/1968 | Huoml | 65/158 |
| 3,462,255 | 8/1969 | Couquelet | 65/158 |
| 3,852,054 | 12/1974 | Dichter | 65/271 X |
| 3,874,867 | 4/1975 | Dichter | 65/271 |
| 4,330,317 | 5/1982 | Vertova | 65/29.14 |
| 4,516,998 | 5/1985 | Ritt et al. | 65/108 |
| 4,675,043 | 6/1987 | Conta et al. | 65/271 X |
| 5,300,134 | 4/1994 | Mönn et al. | 65/109 |

FOREIGN PATENT DOCUMENTS

| | | |
|---|---|---|
| 0116018 | 8/1984 | European Pat. Off. |
| 2192075 | 2/1974 | France . |
| 1093519 | 11/1960 | Germany . |
| 4121611 | 12/1992 | Germany . |

OTHER PUBLICATIONS

"The Moderne Mecanique MM 30 pharmaceutical ampoule machine", Moderne Mecanique, Chelles Cedex, France.
"Spear Regulation Control for Ampoule Automate", Techner Ltd., London, England.

Primary Examiner—Milton Cano
Attorney, Agent, or Firm—Walter Ottesen

[57] ABSTRACT

The invention is directed to a method for controlling the free deformation of thermoplastic material in an automated process for processing the material to form articles. These articles are especially ampules, small bottles and the like produced from glass tubes. In this method, in order to obtain a high dimensional accuracy of the article, a corrective action is carried out by applying heat to the starting material in the deformation region in the heating phase. This corrective action takes place in dependence on a desired-value/actual-value comparison of the deformation of a workpiece achieved in a predetermined working step. In order to exclude interference influences in the development of the deformation, the measurement of the deformation achieved, the desired-value/actual-value comparison and the corrective action are carried out in situ on one and the same workpiece during shaping of the deformation in the heating phase.

19 Claims, 3 Drawing Sheets

METHOD FOR CONTROLLING THE FREE DEFORMATION OF THERMOPLASTIC MATERIAL

FIELD OF THE INVENTION

The invention relates to a method for controlling the free deformation of thermoplastic material in an automated process for the further processing of the material to form articles, in particular in the production of ampules, small bottles and the like from glass tubes. In order to obtain a high dimensional accuracy of the articles with this method, a corrective intervention via the effect of heat on the starting material is carried out in the heating phase in dependence upon a desired-value/actual-value comparison of the deformation of a workpiece in the deformation region achieved in a predetermined process step.

BACKGROUND OF THE INVENTION

Methods of the above kind are of importance in particular in processing hollow glass. Hollow-glass processing is understood to mean all operations in which a new article is produced from preformed raw glass. In general, this is carried out by deformation under the effect of heat. Glass tubes of all kinds are often the starting product for goods of the hollow-glass processing industry.

In this context, in particular the ampules, drinking ampules, small bottles and tablet tubes produced from glass tubes by means of hollow-glass processing can be mentioned, of which the pharmaceutical industry requires a huge amount for filling with its products. The ampules and tubes must be precisely and dimensionally accurately produced in precisely operating automatic equipment so that they can pass through the high-performance automatic filling equipment of the pharmaceutical industry without difficulty.

As an example for such automated processes, ampule production on the so-called MM 30 (a 30-station vertical automatic unit from Moderne Mecanique, 77507 Chelles Cedex, France) is described below. Details of this machine are contained, for example, in company literature.

Glass tubes are clamped into upper and lower chucks for the production of ampules from glass tubes on the MM 30. These clamping points are arranged on a carousel and are fed with glass tubes from above. The zones of the tube to be deformed are heated between the synchronously rotating, aligned chucks to the required processing temperature. The processing step then follows. The deformation is carried out by constriction, drawing or compression by means of the action of flame or by lowering or raising the lower chuck. The processing machine consists of 30 such clamping stations distributed around the circumference of the carousel. The heating of the location of the tube to be processed is carried out via a number of stationary burners which are pivotally mounted and can follow the carousel rotation over a maximum possible arc and act on the glass tube. One ampule is produced per clamping station and per carousel revolution.

In the art, this process is known as "free deformation", that is, deformation without form-imparting mold pieces. The size of the deformation depends on: the length of time that the burners act on the material; the calorific value of the gas; the supply of gas, oxygen and combustion air in a given time; the temperature of the machine and of the ambient; on draft air; on the progressive consumption of the glass tube length; and, on the geometrical dimensions of the glass tube length. These parameters are subject to time-dependent fluctuations and therefore cause fluctuations in the free shaping.

In the case of ampule production, the free deformation plays a decisive part, in particular in the spear formation. For spear formation, the starting glass tube is first heated in the spear region until the glass has softened and a constriction forms in the glass tube as a result of the surface tension of the glass. Subsequently, the ampule spear is drawn out in finished form. The spear diameter and the wall thickness in the spear region depend on the diameter and on the wall thickness of the constriction originally present.

To ensure rapid and reliable filling of the ampules in the high-performance automatic equipment of the pharmaceutical industry mentioned above, high requirements are set for the ampule spear with respect to its dimensional accuracy. Very narrow tolerances have to be maintained in particular with respect to diameter and centricity of the ampule spear. For example, it can be said that the spear diameter of a 5-ml ampule, according to the above-described method may fluctuate by up to ±0.5 mm. However, maintaining tolerances of at most ±0.2 mm is required by companies which utilize the ampules.

To obtain an improvement in this area, a method for controlling the spear formation has been developed by Techner Ltd., London, Great Britain. This method is described, for example, in brochures published by Techner Ltd. In this connection, reference can be made to the publication of Techner Ltd. entitled "Spear Regulation Control for Ampoule Automate"(1991).

In this method, at the last working station of an ampule production machine known per se, for example the MM 30, the finished spear diameter of the ampule passing through this station is determined. In dependence on the deviation of the actual value from the desired value, a corrective intervention by heating in the spear region is carried out for the subsequent workpieces. The assumption underlying this method is that identical heat effects on the identical tube result in identical spears. The determination of the spear diameter is carried out according to Techner by mechanical sensing by means of two discs which are large enough in diameter to avoid damaging the ampule spear. The measurement provides a single diameter measurement value per spear.

According to Techner, the heating of the spear region is controlled corresponding to the determined diameter deviation during the co-running time of two individually controlled burners which act on the spear region of the workpiece in the preheating zone. The relationship between the diameter deviation and the co-running time is, according to Techner, determined empirically by experiments.

Since the measurement of the deformation achieved is only carried out in the last station directly before ejection of the finished ampule, the control resulting from this can, however, only act on the following workpiece. Likewise, the long dead time has the effect that disturbances occurring in the short term during the heating phase, for example, the above-mentioned influencing variables on the free deformation, such as draft, short-term changes in the supply of gas, oxygen and combustion air, sudden temperature jumps in the ambient, et cetera are not detected by the control.

SUMMARY OF THE INVENTION

The object of the invention is to improve a method of the kind mentioned above such that the dead time is as short as possible and that also short-term disturbances occurring in the heating phase can be compensated for by the control.

The method of the invention is for producing an article such as an ampule, bottle or the like from a workpiece made of thermoplastic material such as glass. The method includes the steps of: freely deforming the workpiece in a deformation region to a predetermined extent by applying heat thereto in a preheating phase so as to allow a residual range of deformation to remain in the deformation region; measuring the deformation region to obtain a measurement of the actual value of the deformation; comparing the actual value to a desired value of the deformation in the deformation region to provide a variable indicative of the difference between the actual and desired values; and, again applying heat to the deformation region of the workpiece as a function of the variable to continue deforming the deformation region to correct for the difference as the workpiece is further deformed through the residual range.

The method according to the invention utilizes the measurement of the deformation at a time at which all influencing variables have had a measurable effect and sufficiently large residual deformation still exists. The measurement results make possible the control of the residual deformation. The corrective intervention can therefore be carried out taking into account all influences with the exception of the error which occurs because of an approximation of measuring points of a characteristic line by means of an adaptation curve.

Due to the fact that, according to the method according to the invention, both the measurement of the deformation achieved and the desired-value/actual-value comparison and the corrective action in the heating phase are carried out in situ during the development of the deformation, the dead time of the control is equal to zero. The method according to the invention thus has the advantage that it makes possible an individual action on the deformation process of each individual workpiece.

The invention is by no means limited to ampule production. The invention as such can be readily applied to any methods for further processing of thermoplastic material.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
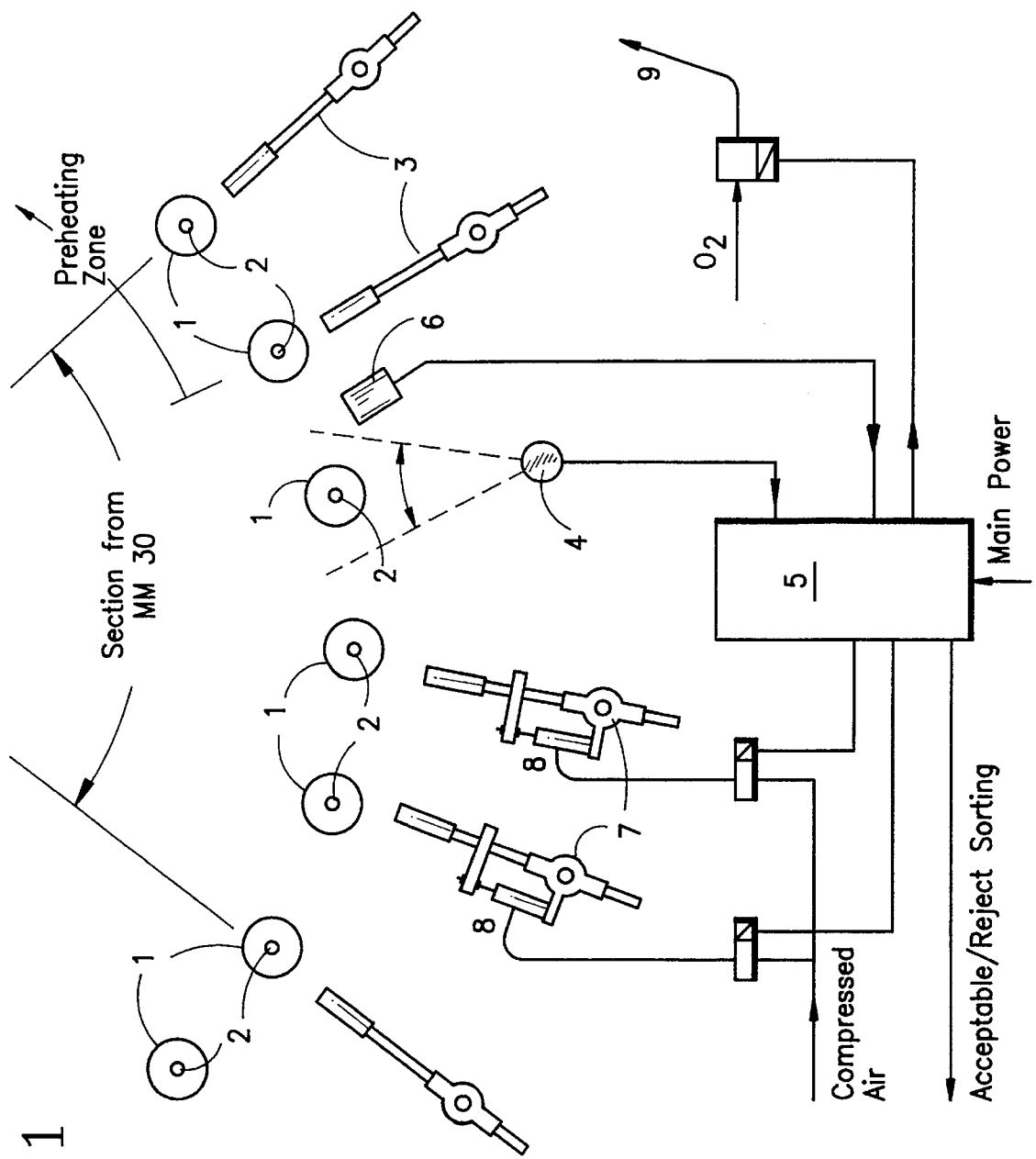
FIG. 1 is a schematic view of an arrangement for controlling the ampule spear diameter in the ampule production on an MM 30.

FIG. 1 shows a schematic view of an arrangement which is suitable for carrying out the method according to the invention for ampule production, in particular for controlling the spear formation on an MM 30. Apparatus parts of the MM 30 which play no part in carrying out the method according to the invention are not shown in FIG. 1 for the sake of clarity.

In FIG. 1, glass tubes 2 are shown clamped in chucks 1, which are mounted on a carousel. The burners are located at several points along a quarter circle. The locations of the tubes to be processed are heated in a preheat zone by a plurality of stationary burners 3 which, as a rule, number 14. In this example, the spear regions are heated. The stationary burners 3 are pivotally mounted and can follow along a maximum possible segment of the rotation of the carousel and act on the glass tube 2.

Following the preheating in the preheating zone, the workpieces (glass tubes 2) are, in the present example, guided past an IR camera 4. IR cameras are known per se and are therefore not described further. The IR camera 4 measures the deformation of the spear region which has already occurred up to this position as a result of the preheating. In general, approximately 80% of the spear heating has already been carried out up to this point in time so that 20% still remains for the corrective action.

The measurement of the deformation, which has already occurred, is carried out in the method according to the invention preferably in a contactless manner, for example, by means of optical dimension sensors.

The thermal radiation emitted by the heated starting material is preferably used for contactless measurement. It has been proven especially advantageous to measure the radiation emitted by the workpiece in a spectral range in which the radiation emitted by the burner flames does not interfere. This is possible in a simple manner by interposing a suitable filter. If, in addition, the thermal radiation is measured in a spectral range in which the radiation intensity is independent of the material thickness, then a uniformly illuminated image of the deformation region with sharp contours is obtained with the aid of the above-mentioned IR camera. The determination of the dimensions of the workpiece in the deformation region is considerably facilitated in this way. A more exact measurement is likewise possible.

In tubular starting material, the free deformation during heating consists in the formation of a constriction in the deformation region because of the surface tension of the glass. It has been found that the diameter and the wall thickness of the originally present constriction determine the diameter and the wall thickness of the finished ampule spear. The method according to the invention is therefore carried out such that the constriction diameter is set to a predetermined value with the constriction diameter corresponding to an unambiguously assigned spear diameter. In this embodiment of the method, the corrective intervention is carried out in dependence on the deviation of the actual constriction diameter from the desired diameter on one and the same article.

As can further be seen from FIG. 1, the IR camera 4, which generally performs 50 measurements per second, has a wide field of view. This affords the advantage that the deformation region (that is, the constriction in the spear region in this embodiment) can be measured over at least one revolution of the workpiece 2 in the rotating chucks 1. This "multiple measurement" permits, in a simple manner, assessment of the ovality and eccentricity of the workpieces 2 in the deformation region. Impermissibly oval or eccentric spears can thereby be separated out in an accept/reject sorting via the control unit 5 shown as a block in FIG. 1.

In FIG. 1, reference numeral 6 identifies a clock generator. The clock generator 6 transmits the period duration from tube to tube and thus the maximum possible co-running time of the burners. This co-running time is less than the period duration by the return time.

Figure 2:
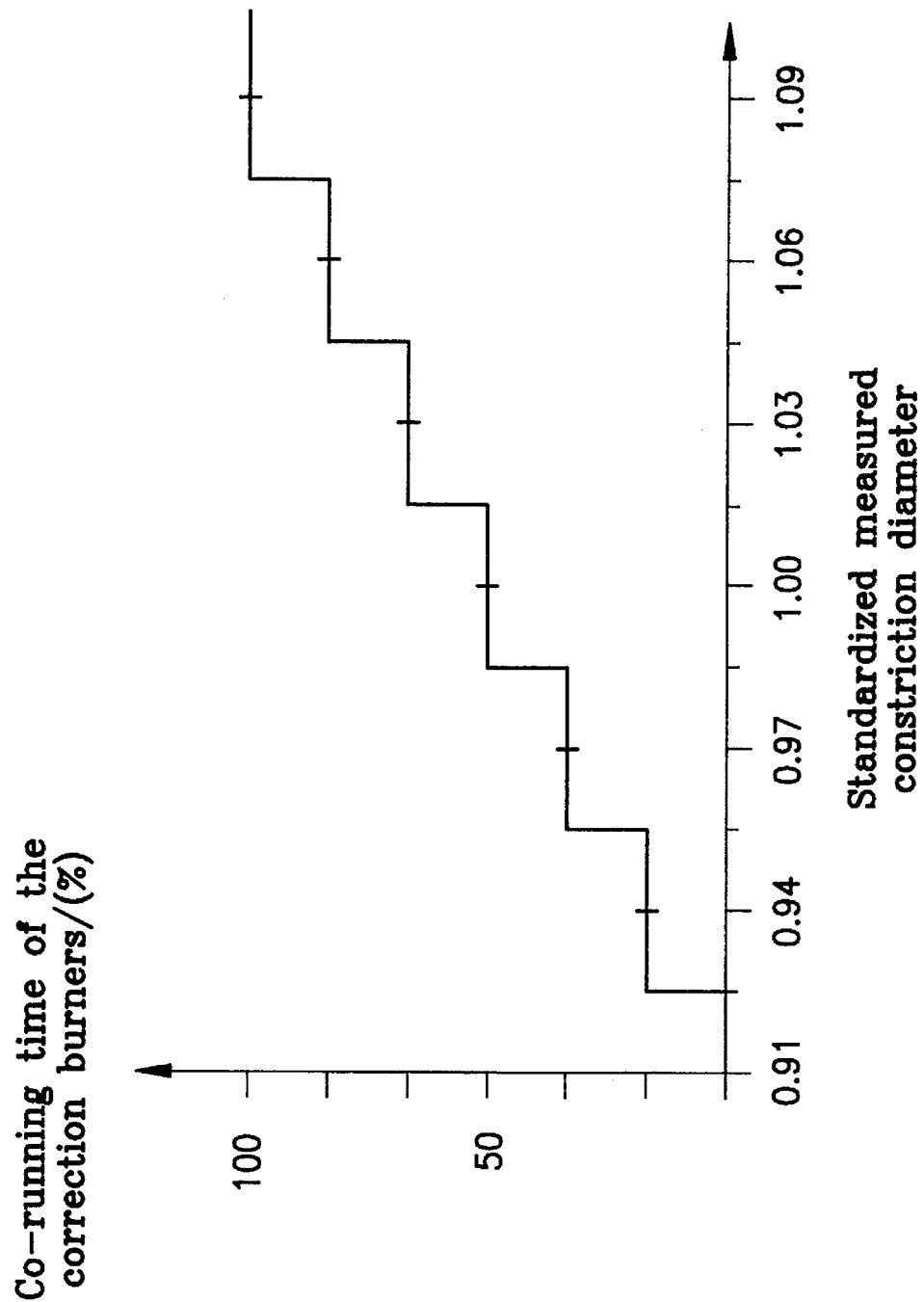
FIG. 2 shows the characteristic curve which is used in the embodiment and represents the empirically determined relationship between the deviation of the constriction diameter and the co-running time of the individually controlled burners; and, FIG. 3 is a diagram showing the fluctuations of the spear diameters during ampule production on an MM 30 compared with one another in uncontrolled and controlled operation.

The control unit 5 contains essentially the experimentally determined characteristic curve for the relationship between the deviation of the actual diameter from the desired diameter of the constriction and the change of the control variable which results therefrom. The empirical determination of this characteristic curve affords the advantage over possible model calculations of generally providing more accurate results, since, for example, all machine influences are automatically included. FIG. 2 shows a possible characteristic curve. A description of this characteristic curve follows below.

Corresponding characteristic curves can be empirically determined in other applications of the method according to the invention.

In FIG. 1, the corrective intervention is carried out controlling the co-running time of two individually controlled burners 7. A corrective action is likewise possible by sequentially switching on and switching off a series of burners or by varying the oxygen supply to the individually controllable burners. As a result, not a change in the flame temperature is achieved, for example, but rather a displacement of the hot zone of the flame towards the workpiece. Furthermore, the corrective action can also be carried out by a controlled cooling.

A space-saving and elegant method is a corrective intervention by means of the intensity, intensity distribution and/or duration of electromagnetic radiation, in particular laser radiation, since in this way, measurement and intervention can take place at one station. The use of a $CO_2$ laser is especially advantageous since this technology is tried and tested. $CO_2$ lasers are furthermore economical and highly efficient.

The characteristic curve of FIG. 2 is suitable for the corrective intervention with the aid of the two individually controllable burners. It is advantageous to step the co-running time of the correction burners in integer multiples of the duration of rotation of the tube to prevent the formation of oval spears. In the characteristic curve, the co-running time of the correction burners is plotted as a function of the standardized measured constriction diameter. The characteristic curve was obtained by setting both corrective actions to 50% and the burners of the preheating zone and the individually controllable burners were so adjusted that the average spear diameters produced correspond to the desired spear diameter (conventional known setting of the machine). Thereafter, a check was made as to whether, with full action of the individually controllable burners, the spear diameters generated are 0.4 mm less than desired diameter and whether, with minimum action, the spear diameters are 0.4 mm greater than the desired diameter. In the event of a deviation, preheating and corrective heating are improved iteratively.

In the method according to the invention, the measurement, evaluation (desired-value/actual-value comparison and conversion into control signals) and control are advantageously supported by computer.

It may be advisable to determine the rate of change of the constriction diameter in cases where this change is particularly high.

In addition to the above-described individual control, it is advantageous to capture non-specific influences on the formation of the spear diameter by controlling the stationary burner group. This is done to maintain the mean diameter of the measured constriction during mean corrective action of the individually controllable burners. In this way, a drifting away of the constriction diameter into ranges which are no longer accessible to correction, is substantially avoided.

Non-specific influences are understood to mean all influences which can act on the formation of the diameter of the spear and which act on the tubes per se. Such influences include: the fluctuations of the calorific value of the gas; the performance of the equipment in the preheating phase; state of the entropy of the gas and the like. These influences operate per so on all tubes which is in contrast to the particular action on an individual workpiece.

For the non-specific intervention, the oxygen supply to the stationary burners 3 (see reference numeral 9 in FIG. 1) is adjusted, for example, by means of a three-point step controller. The control variable is the fraction of the co-running time which is held to 50% with a long equalizing time. The non-specific intervention is an action undertaken as a countermeasure and acts on all tubes. The non-specific intervention can include the above-mentioned change of the oxygen to all stationary burners or, generally, control of all stationary burners.

In the method according to the invention, the results of the desired-value/actual-value comparison can also be applied to correct adjacent shapings.

Ampules, which have measured constriction diameters outside of the still correctable range, are, in the method according to the invention, separated out by sorting in the same manner as ampules with impermissibly oval or eccentric spears.

The production of a controlled constriction is advantageous not only for the spear formation of ampules but also, for example, in the base formation of ampules and small bottles. In small bottles, a uniformly conditioned glass mass for forming shoulder and opening can be provided in this manner. Other continuous processes which make use of the free deformation can also profit from the application of the production of a controlled constriction with respect to the accuracy of geometrical variables of the final product. For example, processes for redrawing rods and tubes, in particular micropipettes and capillaries. The data recorded by the IR camera contain information about the processing state of the glass which can be additionally used for improving the subsequent working steps: base, constriction, and funnel.

EXAMPLES

Figure 3:
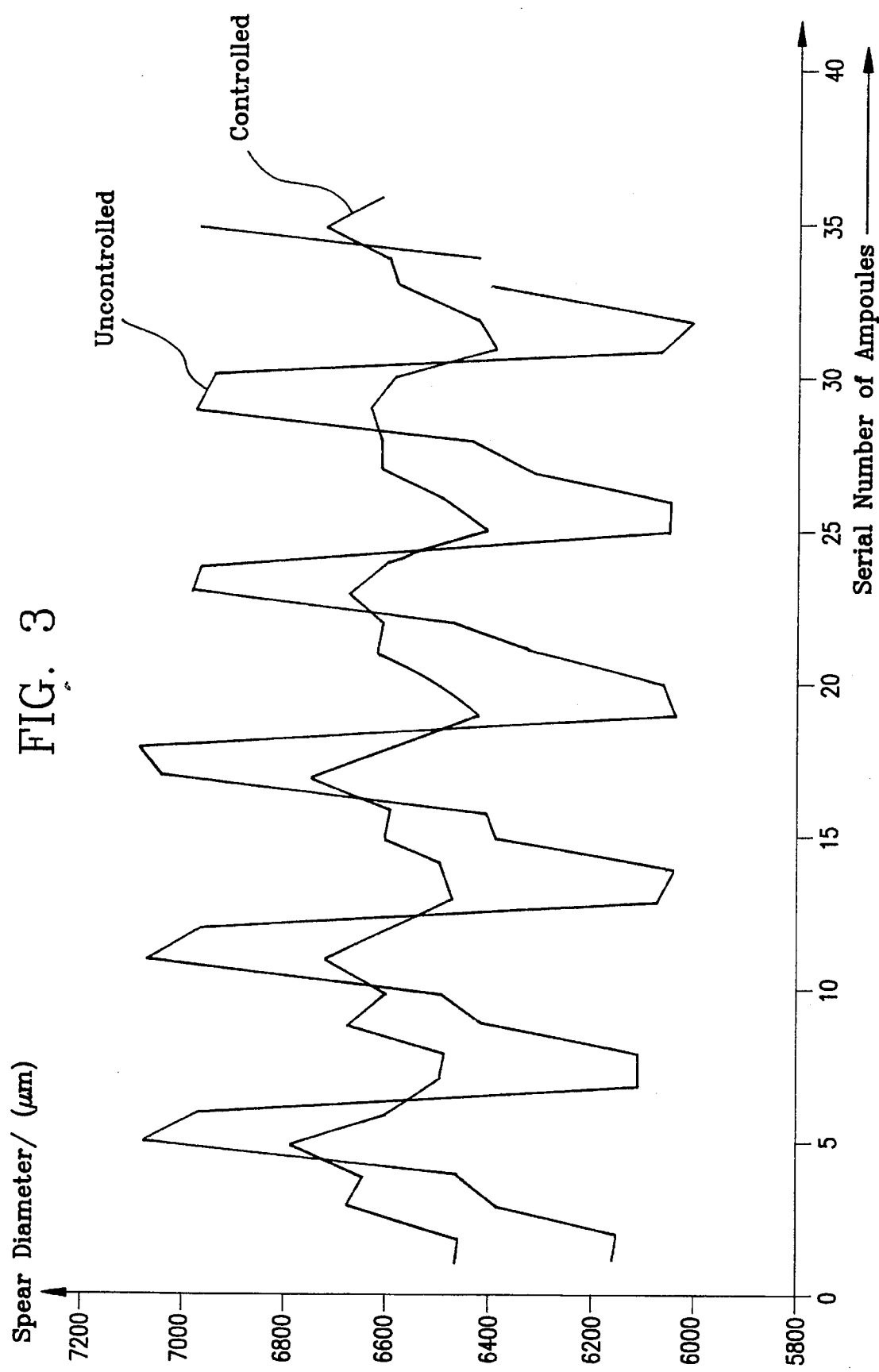

According to the above-described method, 5 ml ampules were produced from a 16.5 mm glass tube on an MM 30 using the control of the constriction diameter according to the invention. For comparison, ampules were also produced in a conventional manner, that is, with uncontrolled operation of the MM 30. The experimental results are shown in FIG. 3.

The experimental arrangement of controlled operation corresponded to that shown in FIG. 1. The deformation region was measured by means of an IR camera. In the arrangement used, the forming constriction was in the field of view of the camera for a segment of approximately 100 mm. The camera makes approximately 50 measurements per second. By using an interference filter, only radiation in the spectral range between 4.25 μm and 4.30 μm was permitted to reach the lead-selenide detector of the camera in order to suppress the IR light emission of the adjacent flames and because of the emissivity of the glass. The desired-value/actual-value comparison and the conversion of the measured characteristic curve (shown in FIG. 2) into control signals for the co-running time of the two individually controlled burners for achieving a pregiven constriction are computer supported.

When taking into account the movement of the tube being processed past the two individually controllable burners 7, 100% co-running time means that both burners are at maximum; 50% co-running time means burner A maximum, burner B without action; 0% means both burners without action.

The burners have roller pairs which are braced on the chucks when the burners are entrained thereby. In this way, the burners are entrained and moved along by the chucks. For co-running time of less than 100%, the roller pair is released earlier from the chuck so that the released burner no longer follows the movement of the chuck. The release or disengagement is achieved utilizing compressed air cylinders 8 which press the roller pair of the particular burner away from the chuck. Accordingly, relative co-running travel paths between 0% and 50% and between 50% and 100% are produced by disengaging the entrained burner from chuck 1 in this manner.

In FIG. 3 it can be seen that, in conventional operation of the MM 30 (uncontrolled), considerable fluctuations of the spear diameters occur (in FIG. 3, the diameters vary between 6.0 mm and 7.1 mm); whereas, in controlled operation, the diameter fluctuations are only slight (in FIG. 3 between 6.4 mm and 6.8 mm).

This result was obtained with starting glass tubes which were selected in pairs with the smallest permissible wall thickness, medium and highest permissible wall thickness (the exact numerical values for the wall thicknesses are unimportant in this context).

It is understood that the foregoing description is that of the preferred embodiments of the invention and that various changes and modifications may be made thereto without departing from the spirit and scope of the invention as defined in the appended claims.

What is claimed is:

1. A method for controlling free deformation of a thermoplastic material in the production of an article including an ampule and a bottle from a workpiece made of the thermoplastic material including glass, the method comprising the steps of:

freely deforming said workpiece in a deformation region to a predetermined extent by applying heat thereto in a preheating phase so as to allow a residual range of deformation to remain in said deformation region;

measuring, after completing and ending said preheating phase, an intermediate deformation of said deformation region to obtain a measurement of an actual value of the deformation;

comparing said actual value to a desired value of the deformation in said deformation region to provide a variable indicative of the difference between the actual and desired values and therefore indicative of said intermediate deformation; and applying heat to said deformation region of said workpiece as a function of said variable to continue deforming said deformation region to correct for said difference as the workpiece is further deformed through said residual range and thereafter drawing out said deformation region until the deformation of said deformation region reaches its end value.

2. The method of claim 1, wherein the measurement of said deformation region is made without physical contact.

3. The method of claim 2, wherein the measurement is made with an optical dimension sensor.

4. The method of claim 2, wherein the contactless measurement is carried out via the thermal radiation emitted by the heated material of said deformation region.

5. The method of claim 4, wherein the heat is supplied to said deformation region with a burner supplying a flame emitting heat radiation; and, said thermal radiation is measured in a spectral range wherein said heat radiation of said flame does not constitute a disturbance.

6. The method of claim 4, wherein said thermal radiation is measured in a spectral range wherein the intensity of said thermal radiation is independent of the thickness of said material.

7. The method of claim 1, wherein said workpiece made of thermoplastic material is a tube; said deformation region is a constriction formed in said tube; and, said constriction having a diameter adjusted to a pregiven value.

8. The method of claim 7, further comprising the step of determining the rate of change of said diameter while said deformation region is being formed.

9. The method of claim 7, further comprising the steps of:

empirically determining a characteristic curve defining the time during which said heat is again applied as a function of a standardized measure of said constriction diameter; and, utilizing said characteristic curve to convert said variable into a control signal for again applying said heat to said deformation region to correct for said difference.

10. The method of claim 7, wherein a plurality of tubular workpieces is processed and each workpiece is rotated through at least one revolution; and, each of said workpieces is measured during said revolution to detect and separate out those workpieces having impermissible oval or eccentric constrictions.

11. The method of claim 1, wherein said comparison is applied to correct shaping adjacent said deformation region.

12. The method of claim 1, wherein said workpiece is held in a holder which is moved along a predetermined path; the heat is again applied to said deformation region utilizing burners which can engage with said holder to co-run therewith through a predetermined portion of said path; and, wherein the corrective action of each of said burners on said deformation region is controlled by adjusting the time for which the burner co-runs with the holder and/or by a sequentially switching-on and switching-off of said burners.

13. The method of claim 12, wherein said corrective action is controlled by adjusting the supply of oxygen to said burners.

14. The method of claim 12, wherein said corrective action is controlled by the intensity, the intensity distribution and/or duration of electromagnetic radiation.

15. The method of claim 14, wherein said radiation is that of a $CO_2$ laser.

16. The method of claim 12, wherein the first application of heat is carried out with burners as the workpiece is passed through a preheat zone; and, wherein a corrective action is carried out by adjusting the amount of oxygen supplied to said burners of said preheat zone to thereby maintain the measured diameter during the corrective action of each of the burners which again apply heat to the deformation region after said workpiece passes out of said preheat zone.

17. The method of claim 1, wherein said difference is corrected by allowing the workpiece to cool down in a controlled manner.

18. The method of claim 1, wherein the measurement, evaluation and control are all computer supported.

19. A method for controlling free deformation of a thermoplastic material in the production of an article including an ampule and a bottle from a workpiece made of the thermoplastic material including glass, said workpiece being held in a holder moved along a predetermined path, the method comprising the steps of:

freely deforming said workpiece in a deformation region, being a constriction having a diameter, to a predetermined extent by applying heat thereto in a preheating phase so as to allow a residual range of deformation to remain in said deformation region;

measuring, after completing and ending said preheating phase, an intermediate deformation of said deformation region by scanning said diameter with an infrared camera to obtain a measurement of an actual value of said deformation;

comparing said actual value to a desired value of said deformation in said deformation region to provide a variable indicative of the difference between the actual and desired values and therefore indicative of said intermediate deformation;

applying heat to said deformation region of said workpiece as a function of said variable to continue deforming said deformation region for correcting said difference as the workpiece is further deformed through said residual range and thereafter drawing out said deformation region until said deformation of said deformation region reaches its end value, said heat being applied to said deformation region utilizing burners engaging said holder to co-run therewith through a predetermined portion of said path; and controlling said deformation in said deformation region by adjusting the time for which said burners co-run with said holder and/or by sequentially switching-on and switching-off of said burners.

* * * * *